United States Patent
Suryanarayana et al.

(10) Patent No.: US 10,489,594 B2
(45) Date of Patent: Nov. 26, 2019

(54) SYSTEM AND METHOD FOR SECURE MIGRATION OF VIRTUAL MACHINES BETWEEN HOST SERVERS

(71) Applicant: DELL PRODUCTS, LP, Round Rock, TX (US)

(72) Inventors: Shekar Babu Suryanarayana, Bangalore (IN); Lucky Pratap Khemani, Bangalore (IN); Sumanth Vidyadhara, Bangalore (IN); Chandrasekhar Puthillathe, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 111 days.

(21) Appl. No.: 15/654,424

(22) Filed: Jul. 19, 2017

(65) Prior Publication Data

US 2019/0026467 A1   Jan. 24, 2019

(51) Int. Cl.

| | |
|---|---|
| G06F 7/04 | (2006.01) |
| H04L 29/06 | (2006.01) |
| H04L 9/32 | (2006.01) |
| G06F 12/14 | (2006.01) |
| G06F 21/57 | (2013.01) |
| G06F 9/455 | (2018.01) |
| G06F 9/50 | (2006.01) |

(52) U.S. Cl.
CPC .......... *G06F 21/57* (2013.01); *G06F 9/45558* (2013.01); *G06F 9/5088* (2013.01); *G06F 2009/4557* (2013.01); *G06F 2009/45587* (2013.01)

(58) Field of Classification Search
CPC .... G06F 21/57; G06F 9/45558; G06F 9/5088; G06F 2009/45587; G06F 2009/4557
USPC ............. 726/26, 30; 713/165, 168, 192, 193
See application file for complete search history.

(56) References Cited

U.S. PATENT DOCUMENTS

| | | | |
|---|---|---|---|
| 8,219,792 B2 | 7/2012 | Jaber et al. | |
| 8,589,902 B2 | 11/2013 | Jones et al. | |
| 9,189,631 B2 | 11/2015 | Liu et al. | |
| 9,524,390 B2 | 12/2016 | Kulkarni et al. | |
| 2005/0204357 A1* | 9/2005 | Garg | G06F 9/45558 718/1 |
| 2007/0189275 A1* | 8/2007 | Neff | H04L 29/06027 370/352 |

(Continued)

FOREIGN PATENT DOCUMENTS

EP    1 975 836 A2    10/2008

*Primary Examiner* — Aravind K Moorthy
(74) *Attorney, Agent, or Firm* — Larson Newman, LLP

(57) ABSTRACT

A pair of servers may include a source server hosting a source virtual machine (VM) and a target server hosting a target VM. The source server may include a source central processing unit (CPU) and a source baseboard management controller (BMC), and the target server may include a target CPU and a target BMC. The source server and the target server are connected by an inband connection, and the source BMC and the target BMC are connected by a connection distinct from the inband connection. The source VM may be migrated to the target server over the inband connection, and in response to migrating the source VM, security data corresponding to the source VM is communicated from the source BMC to the target BMC over the connection between the BMCs.

20 Claims, 5 Drawing Sheets

(56) References Cited

U.S. PATENT DOCUMENTS

| | | | |
|---|---|---|---|
| 2008/0244257 A1 | 10/2008 | Vaid et al. | |
| 2009/0327741 A1 | 12/2009 | Zimmer et al. | |
| 2010/0257597 A1* | 10/2010 | Miyazaki | G06F 21/41 726/8 |
| 2011/0307709 A1* | 12/2011 | Cox | G06F 21/79 713/183 |
| 2011/0307712 A1 | 12/2011 | Sathikumar et al. | |
| 2013/0185402 A1* | 7/2013 | Ayanam | H04L 41/0813 709/221 |
| 2014/0245053 A1* | 8/2014 | Yoshikawa | G06F 1/3253 713/324 |
| 2014/0250291 A1 | 9/2014 | Adams et al. | |
| 2014/0258294 A1* | 9/2014 | Shulman | G06F 17/30082 707/737 |
| 2014/0359615 A1* | 12/2014 | Chuang | G06F 9/45558 718/1 |
| 2014/0365755 A1 | 12/2014 | Liu et al. | |
| 2015/0193620 A1 | 7/2015 | Khatri et al. | |
| 2015/0309907 A1* | 10/2015 | Wang | G06F 11/267 714/25 |
| 2016/0117240 A1* | 4/2016 | Dinkjian | G06F 12/02 711/165 |
| 2016/0203017 A1* | 7/2016 | Davenport | H04L 67/1008 718/1 |
| 2016/0286574 A1* | 9/2016 | Abraham | H04L 63/065 |
| 2017/0013515 A1* | 1/2017 | Bangolae | H04W 52/0235 |
| 2017/0206110 A1* | 7/2017 | Huang | G06F 9/45558 |
| 2018/0032734 A1* | 2/2018 | Gunti | G06F 21/575 |
| 2018/0054245 A1* | 2/2018 | Trainin | H04W 16/28 |
| 2018/0091315 A1* | 3/2018 | Singhal | H04L 9/3268 |
| 2018/0165455 A1* | 6/2018 | Liguori | G06F 21/575 |
| 2018/0189087 A1* | 7/2018 | Palermo | G06F 9/45558 |

\* cited by examiner

SYSTEM AND METHOD FOR SECURE MIGRATION OF VIRTUAL MACHINES BETWEEN HOST SERVERS

FIELD OF THE DISCLOSURE

This disclosure generally relates to information handling systems, and more particularly relates to migrating virtual machines between host servers, and providing security to a migrated virtual machine.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A pair of servers may include a source server hosting a source virtual machine and a target server hosting a target virtual machine. The source server may include a source central processing unit (CPU) and a source baseboard management controller (BMC), and the target server may include a target CPU and a target BMC. The source server and the target server are connected by an inband connection, and the source BMC and the target BMC are connected by a connection distinct from the inband connection. A source virtual machine (VM) may be migrated to the target server over the inband connection, and in response to migrating the source VM, security data corresponding to the source VM is communicated from the source BMC to the target BMC over the connection between the BMCs.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
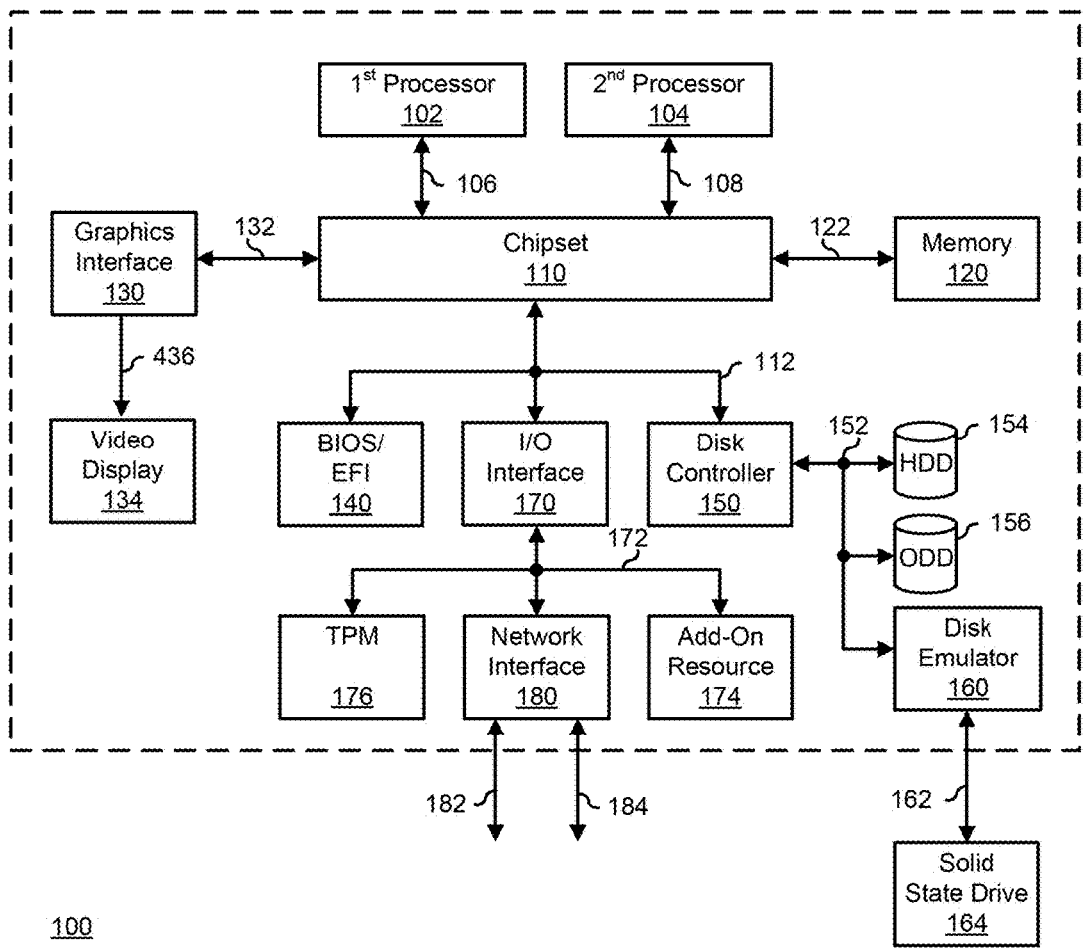
FIG. 1 is a block diagram illustrating a generalized information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a processor system which may be a System-on-a-Chip (SoC), a personal computer, a laptop computer, a smart phone, a tablet device or other consumer electronic device, storage array, a network server, a network storage device, a switch router or other network communication device, or any other suitable device and may vary in size, shape, performance, functionality, and price. Further, information handling system 100 can include processing resources for executing machine-executable code, such as a CPU, a programmable logic array (PLA), an embedded device such as a SoC, or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174, to a TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

An example information handling system is a server. A server may have network communication functionality and provide a connection to one or more networks or network connections. A server may include a set of processors and a set of network connections and may be physically defined by a server chassis. A server may include a baseboard management controller (BMC). A BMC is a service processor that monitors the physical state of the server and server devices using sensors and communicating with a system administrator through a connection that may be out of band or sideband. The BMC runs independently from other processors and hence in the event of processor, memory or other hardware failure, the BMC may still perform BMC functions such as monitoring.

Figure 2:
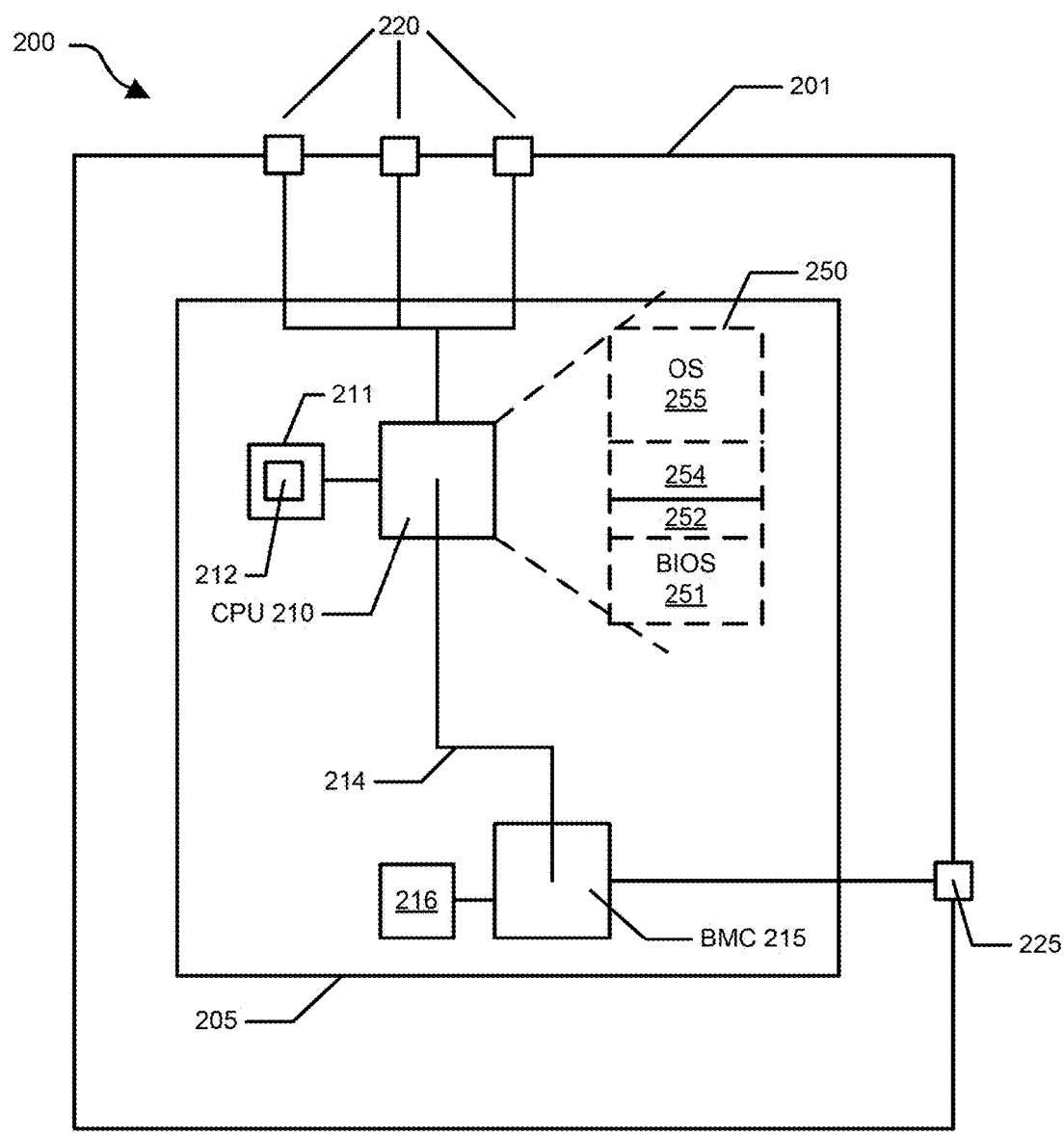
FIG. 2 is a block diagram illustrating a generalized server according to an embodiment of the present disclosure.

FIG. 2 shows an example server 200. Server 200 includes a CPU set 210 and a BMC 215. More particularly, server 200 may be defined by server chassis 201 containing server motherboard 205. Mounted on motherboard 205 are CPU set 210 and BMC 215. BMC 215 and CPU set 210 may be connected on motherboard 205 by one or more connections such as traces on motherboard 205 as shown. For example, CPU set 210 may be communicatively connected to BMC 215 by a channel for communication which may be, for example, a shared memory access (SMA) channel 214. CPU set 210 may have local memory 211 accessible by CPU set 210 to provide local data storage for CPU set 210. BMC 215 may have local BMC memory 216 accessible by BMC 215 to provide local data storage for BMC 215.

Server 200 may have multiple network connections 220 for providing network capability and network connections 220 may be considered inband connections providing network connectivity to server 200. Network connections 220 may be connected to motherboard 205, and ultimately to CPU set 210 as shown. Because network connections 220 provide network connectivity to server CPU set 210, network connections 220 provide inband connectivity to server 200. Server 200 may further include a sideband or out-of-band connection 225 which provides connectivity to BMC 215 as shown. Connection 225 may provide a service connection to server 200, allowing an administrator to interface with server 200 out of band for service.

In operation, CPU set 210 hosts a software stack 250 which includes a Basic Input/Output System (BIOS) 251 and an operating system (OS) 255 operating on top of BIOS 251. A BIOS is non-volatile firmware used to perform hardware initialization during the booting process (power-on startup), and to provide runtime services for operating systems and programs; as such a BIOS provides an abstraction layer between hardware and OS. As shown in software stack 250, BIOS 251 and OS 255 may provide runtimes services 252 and hypervisor 254. More particularly, runtime services may be a function provided by BIOS 251 and hypervisor 254 may sit atop runtime services 252 and be provided by BIOS 251 and OS 255, or by OS 255. A hypervisor may be considered a virtual machine monitor (VMM), and is computer software, firmware or hardware that creates and runs virtual machines (VMs). A computer on which a hypervisor runs one or more VMs is called a host machine, and each VM is called a guest machine. The hypervisor presents the guest operating systems with a virtual operating platform and manages the execution of the guest operating systems. Thus, hypervisor 254 may instantiate one or more VMs.

It may be desirable to securely boot a VM or otherwise secure or provide security to a VM. To this end, BIOS 251 may store a secure boot key (SBK) 212 in memory 211 for a VM instantiated by hypervisor 254 as part of runtime services 252. This SBK 212 may be used to provide security for an instance of a VM by allowing a secure boot of the VM associated with SBK 212, for example. It may also be desirable to migrate, or transfer, VMs from one physical server to a different physical server such that the migrated VM is hosted by a different server. It is also desirable to securely boot a VM or otherwise secure or provide security to a VM migrated to a different physical server.

To securely boot a VM or otherwise secure or provide security to a VM migrated to a different physical server, the SBK associated with the VM may also be provided the different server and used to securely boot the migrated VM or otherwise secure or provide security to the migrated VM. To this end, and using server 200 as an example, upon determination at server 200 of a migration of a VM, BMC 215 accesses SBK 212 or obtains SBK from CPU set 210 over connection 214 and transfers SBK 212 out of band over connection 225 to a corresponding BMC in the different physical server hosting or to host the migrated VM. The corresponding BMC then provides SBK 212 to securely boot the migrated VM or otherwise secure or provide security to the migrated VM at the different physical server. The secure boot keys may be associated with a time-out period after which the SBKs cannot be used for authorization of the migrated VM.

As would be understood by one of skill in the art, SBK 212 may be stored at 216 for access by BMC 215 prior to being transferred to the different physical server out of band over connection 225.

Figure 3:
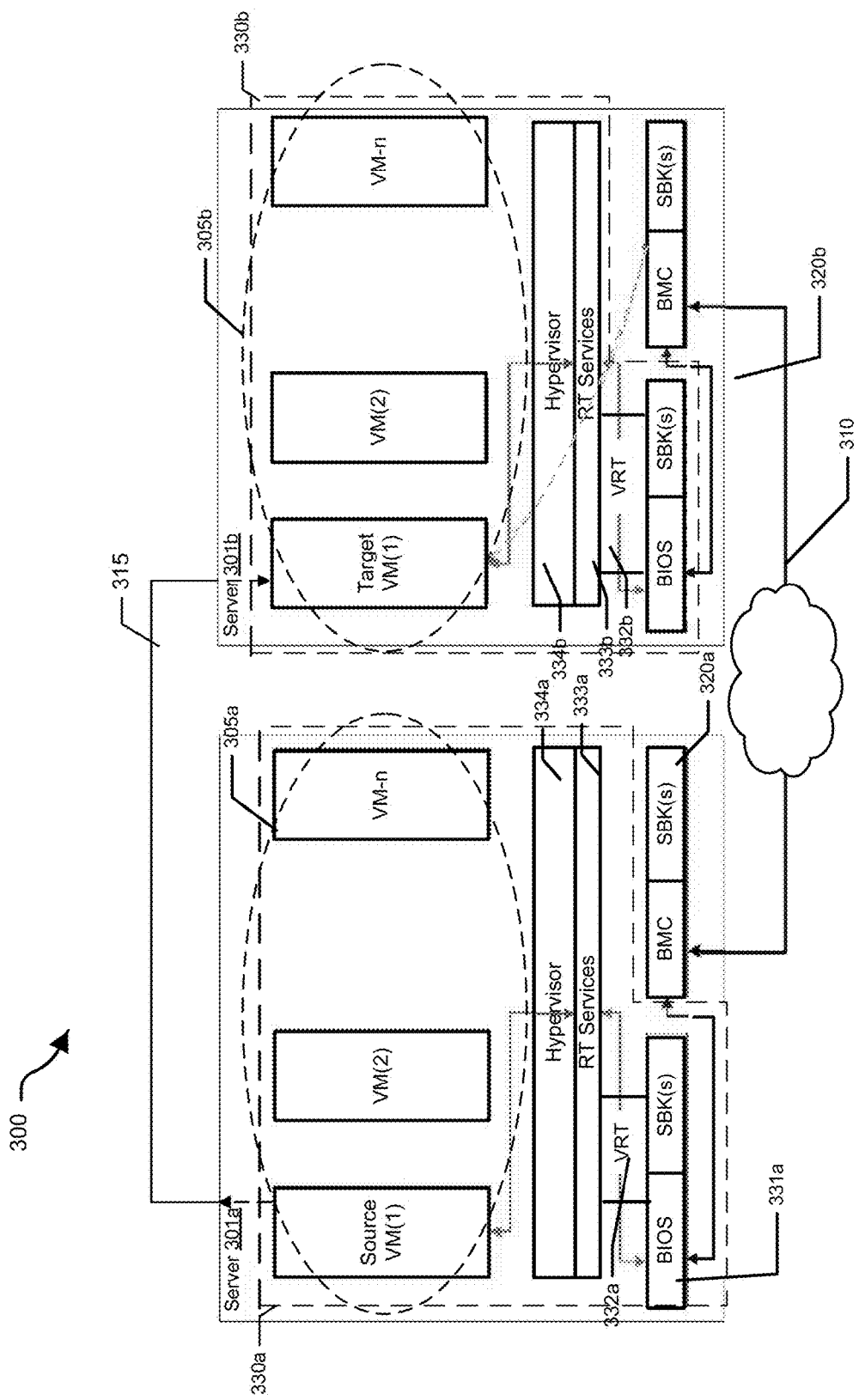
FIG. 3 is a block diagram illustrating a server system according to an embodiment of the present disclosure.

FIG. 3 shows a logical representation 300 of two servers 301a and 301b and a process for securely migrating VMs between the servers 301a and 301b. Server 301a includes a set of VMs 305a including VMs 1-n, for example VM(1) . . . VM(n); and server 301b includes a set of VMs 305b including VMs 1-n, for example VM(1) . . . VM(n). As can be seen from FIG. 3, servers 301a and 301b are connected out of band by out of band connection 310 between BMCs; servers 301a and 301b are also connected inband over network connection 315. Out of band connection 310 may be a part of a management network by which an administrator may access BMCs 320a and 320b. Network connection 315 may be a network connection that is a part of a larger network, such as an intranet, for example, to which servers 301a and 301b are communicatively connected.

In a VM migration operation between servers 301a and 30b, VM(1) is the source VM and is sent over connection 315 from server 301a to server 301b and as such is migrated to server 301b as target VM VM(1), as shown in FIG. 3. SBKs associated with source VM(1) resident on server 301a are sent from BMC 320a to BMC 320b of server 301b over connection 310, where said SBKs may be used for secure boot or other security or authorization of target VM VM(1) resident on server 301b.

More particularly, server 301a includes a CPU set 330a hosting a BIOS 331a storing SBKs for VMs 305a, and these SBKs may be stored in a local memory accessible by CPU set 330a for access by BIOS 331. CPU set 330a may further host virtual runtime services 332a, runtime services 333a, and hypervisor 334a which instantiated VMs 305a. Server 301b in turn includes a CPU set 330b hosting a BIOS 331b, virtual runtime services 332b, runtime services 333b, and hypervisor 334b.

In an exemplary embodiment of VM migration in the context of FIG. 3, source VM(1) of server 301a identifies target VM(1) of server 301b and initiates live migration to target VM(1) at server 301b over connection 315. Source VM(1) provides an indication of a secure migration event to BMC 320a via runtime services 333a, virtual runtime services 332a, and BIOS 331a. BMC 320a obtains SBKs for securely booting or authorizing source VM(1) from BIOS 331a, and sends the SBKs to BMC 320b of server 301b. BMC 320b may provide the received SBKs to BIOS 331b. BIOS 331b stores the received SBKs so that the received SBKs can be used to securely boot or authorize target VM(1) of server 301b such that there is a secure migration of source to target VM(1).

Connection 315 may be considered to be an inband connection because server 301a and 30b are connected over server network connections with a server. Furthermore, connection 315 is inband because the operating systems hosted by the CPUs of the servers are implicated in connection 315. In contrast, connection 310 is an out of band (OOB) or sideband connection connecting server BMCs and isolated from the operating systems of the servers.

Figure 4:
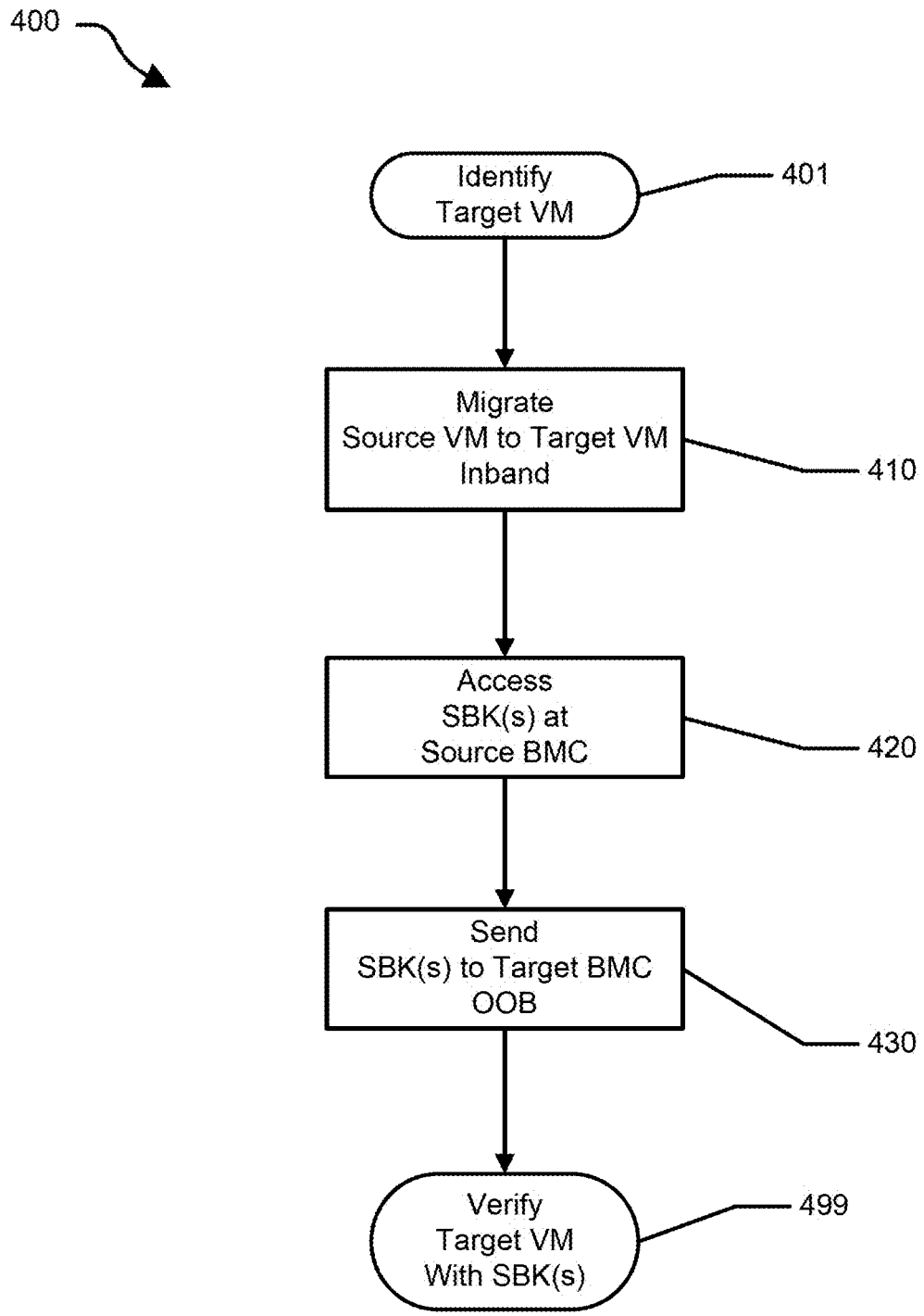
FIG. 4 illustrates a flowchart for secure virtual machine migration according to an embodiment of the present disclosure.

FIG. 4 shows a flowchart of a process 400 for verifying a migrated target VM with SBKs. 400 begins at 401 and the target VM is identified. For example, a source VM at a source server may identify a target server and a target VM on the target server, or a target VM may be otherwise selected, for example, by an administrator or background system process. For purposes of the following description, the server hosting the source VM is referred to as the source server, and the server hosting the target VM is referred to as the target server.

At 410, the source VM at the source server is migrated to the target VM at the target server in band over a network connection between the source server and the target server. The migration of the source VM may trigger a secure migration event, an indication of which may be sent to the source BMC of the source server. For example, the source VM may generate an indication of the secure migration event which is sent from the source server CPU to the source BMC of the source server via a connection between CPU and BMC internal to the source server, for example SMA 214 of FIG. 2.

At 420, subsequent to receiving an indication of the secure migration event, the source BMC at the source server accesses or obtains one or more SBK(s) corresponding to the source VM and used to securely boot or verify the source VM. For example, the SBK(s) may be maintained by the BIOS of the source server. The BIOS may also receive the indication of the secure migration event from the source VM, for example, and may access stored SBK(s) corresponding to the source VM and provide the SBK(s) to the source BMC. For example, the SBK(s) may be sent by the BIOS from the source server CPU to the source BMC of the source server via a connection between CPU and BMC internal to the source server, for example SMA 214 of FIG. 2.

As a further example of the source BMC obtaining the SBK(s) at 420, in response to receiving the indication of the secure migration event, the source BMC at the source server may interface with the source server BIOS using virtual runtime services to obtains one or more SBK(s) corresponding to the source VM via a connection between CPU and BMC internal to the source server. In embodiments, the SBK(s) may be maintained by the BIOS of the source server at the BIOS level or layer to prevent corruption or attacks on the SBK(s) and securely maintain the SBK(s). The SBK(s) may be isolated from the hypervisor in the BIOS layer such that security breaches at the hypervisor or attacks at the hypervisor do not affect SBK(s) maintained at the BIOS level.

At 430, the source BMC at the source server sends the one or more SBK(s) corresponding to the source VM and thus the target VM to the target BMC of the target server out of band. For example, the source BMC and the target BMC may be connected by an administration network providing access by an administrator to the server BMC outside server connections to a network for data traffic such as audio or video data. The source BMC may send the SBK(s) corresponding to the source and target VMs to the target BMC over this out of band or sideband network connecting BMCs. Thus, the target BMC of the target server will obtain SBK(s) corresponding to the target VM which may be used to securely boot or otherwise verify the target VM.

Method 400 ends at 499 when the target BMC of the target server provides for verifying or securely booting the target VM at the target server with the SBK(s) obtained from the source BMC. For example, the target BMC may pass the received SBK(s) to the BIOS running on the target server so that the BIOS may provide for securely booting the target VM at the target server or otherwise verifying or securing the target VM running on the target server.

Figure 5:
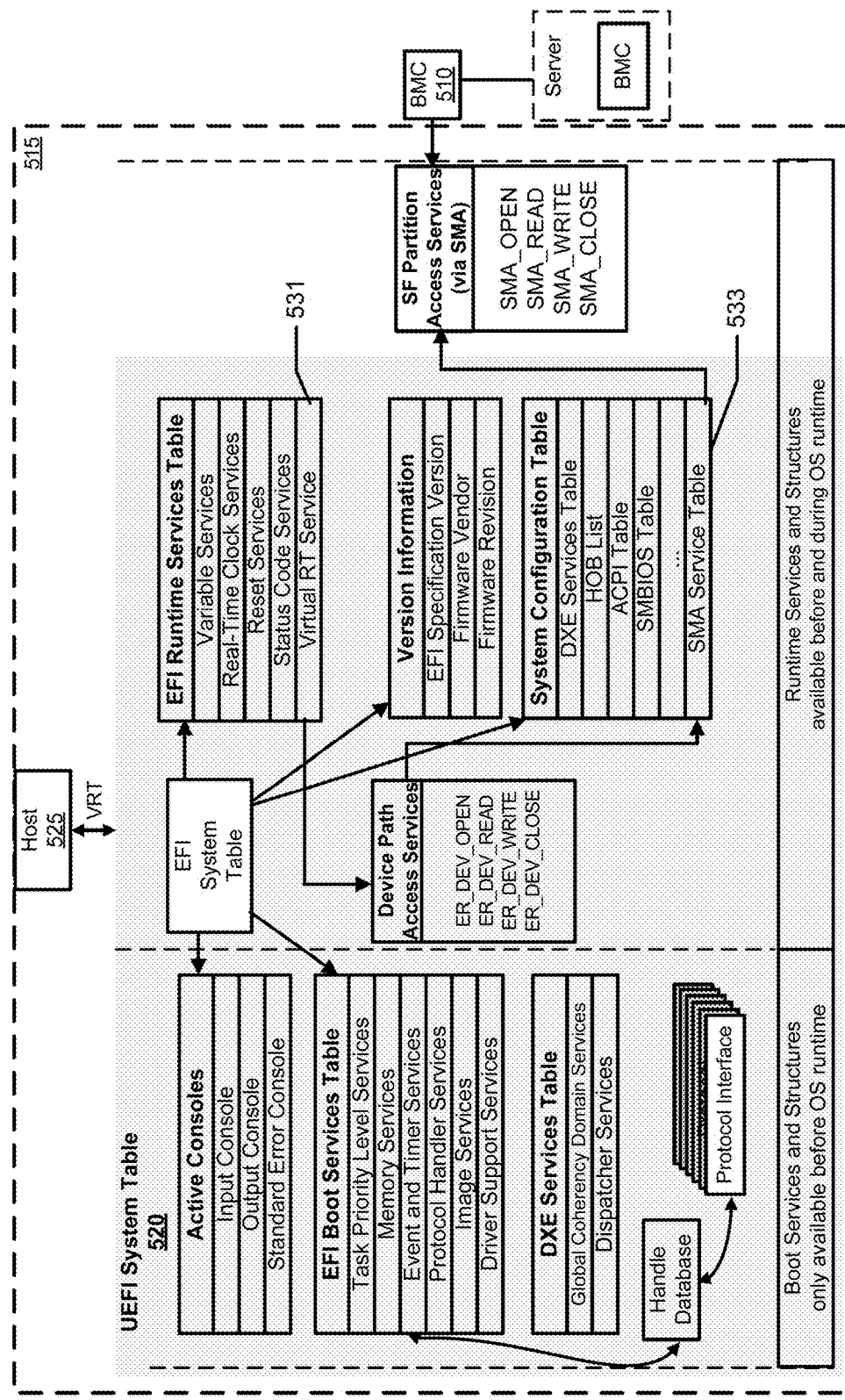
FIG. 5 is a block diagram illustrating a server system according to an embodiment of the present disclosure.

A server may run a Unified Extensible Firmware Interface (UEFI) to supplement or subsume a BIOS. The UEFI specification provides standard interfaces and interoperability guidelines for devices that together make up a server. In particular, the UEFI provides a standardized architecture and data structures to manage initialization and configuration of devices, booting of platform resources, and passing of control to the operating system. The UEFI specification allows for the extension of platform firmware by loading UEFI driver and UEFI application images. For example, an OEM can include customized or proprietary images to provide enhanced control and management of the server. The UEFI specification provides Security Architecture Protocols to abstract policy actions on image invocation, facilitating implementation of custom, proprietary, security policies FIG. 5 shows a server 500 hosting a UEFI. More particularly, server 500 includes BMC 510 and hosts a UEFI 520 and host 525 on CPU 515 communicatively coupled to BMC 510. Host 525 may host a target VM (not shown). Host 525 may provide an indication of a VM migration (for example, regarding the target VM) to UEFI 520 with virtual runtime services 531. This may interface with a service table 533 to access BMC 510 to obtain SBK(s) associated with the target VM over the internal server connection between BMC and CPU. BMC 510 may be connected out of band to the BMC of the server hosting the source VM and may obtain SBK(s) corresponding to the source VM as discussed above.

A UEFI may be leveraged to securely obtain SBK(s), and the connection between BMC and CPU internal to the server may be used to securely obtain SBK(s). Virtual runtime services may be triggered by a VM during a VM migration; the call to virtual runtime services may be diverted by the hypervisor with calls to locate the EFI System table of the UEFI. The EFI system table indexes to a virtual runtime services entry the virtual runtime services map to a dynamic devices path access services to dynamically map interface drivers to communicate with the BMC over the internal server connection between CPU and BMC. The dynamic devices path access services may perform a discovery operation for SBK(s). For example, if the server BMC lacks a set of SBK(s), the BMC may obtain SBK(s) from a different server, as discussed herein.

Thus, SBK(s) are stored at the BIOS level and transferred between CPU and BMC over an internal connection interior to a server to provide security for the SBK(s). For secure VM migration, the source VM initiates migration after identifying the target VM. The BMC of the server hosting the source VM receives an indication of secure migration from the source VM and in response obtains SBK(s) corresponding to the source VM. These SBK(s) are transferred to the BMC of the server hosting the target VM. The BIOS of the server hosting the target VM may then obtain the SBK(s) over the internal connection between CPU and BMC. A path can be maintained to the SBK(s) stored at the BMC at a system configuration table of a UEFI, for example. Virtual runtime services may dynamically create or maintain the path to access the SBK(s) at the BMC in the configuration table. This path may be accessed by hypervisor calls.

As discussed above, internal to a server, the CPU and BMC may be communicatively connected by a connection which may be a SMA connection. SBK(s) may be securely transferred between the BMC and CPU of the server using the internal SMA connection. An activity by (or corresponding to) a VM may trigger execution of virtual runtime services in the server which access a SMA service table in a system configuration table, which may be part of a UEFI, for example. The SMA service table may provide a path to access or provide SBK(s) from or to the BMC over the SMA connection. Thus, there may be an dynamic mapping between BMC and CPU internal to a server to dynamically transfer SBK(s) between BMC and CPU.

While in the above, SBK(s) have been discussed in the context of security data for verifying a target VM, this is by way of example, and other security data including SBK(s) may be transferred between servers as discussed above and used to verify or secure target VMs. Furthermore, SBK(s) and other security data associated with a VM may be time-limited and may be valid for a temporal duration before becoming invalid after the temporal duration. The temporal duration may be negotiated between the BMCs of source and target VMs, for example.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A server set comprising:
   a first server including a first central processing unit (CPU) and a first baseboard management controller (BMC), wherein the first CPU hosts a source virtual machine (VM); and
   a second server including a second CPU and a second BMC, wherein the second CPU hosts a target VM, wherein the first server and the second server are connected by a first connection and the first BMC and the second BMC are connected by a second connection distinct from the first connection, and wherein:
   the source VM is migrated from the first server to the second server over the first connection, and
   in response to migrating the source VM, security data corresponding to the source VM is communicated from the first BMC to the second BMC over the second connection, wherein the security data includes a time-limited duration that is negotiated between the source BMC and the target VM.

2. The server set of claim 1, wherein the first connection is an inband connection and the second connection is an out of band connection.

3. The server set of claim 1, wherein the security data comprises an SBK corresponding to source VM and the SBK is to be used to securely boot the target VM.

4. The server set of claim 1, wherein the security data is maintained at a first BIOS hosted by the first CPU.

5. The server set of claim 4, wherein the first BMC and the first CPU are communicatively connected internal to the server by an internal server connection.

6. The server set of claim 5, wherein in response to migrating the source VM, the security data is transferred from the first BIOS to the first BMC over the internal server connection.

7. The server set of claim 6, wherein the internal server connection includes an SMA path.

8. The server set of claim 1, wherein the second BMC and the second CPU are communicatively connected internal to the server by an internal server connection providing a communication channel between the second BMC and the second CPU.

9. The server set of claim 8, wherein in response to migrating the source VM, the security data is obtained from the second BMC at the second CPU over the communication channel.

10. The server set of claim 9, wherein migrating the source VM triggers execution of virtual runtime services at the second CPU and the virtual runtime services access a system configuration table of the second server to dynamically map a path to the second BMC to obtain the security data.

11. A source server comprising:
    a source central processing unit (CPU), wherein the source CPU hosts a source virtual machine (VM);
    a source baseboard management controller (BMC), wherein the source CPU and the source BMC are communicatively connected internal to the server by an internal server connection providing a communication channel between the source BMC and the source CPU, and wherein:
    in response to identifying a target VM on a target server, the source VM is migrated to the target VM over an inband connection connecting the source server to the target server, and
    in response to migrating the source VM, security data corresponding to the source VM is transferred from a BIOS hosted by the source CPU to the source BMC over the internal server connection, wherein the security data includes a time-limited duration that is negotiated between the source BMC and the target VM.

12. The source server of claim 11, wherein the security data includes an SBK for securely booting the target VM.

13. The source server of claim 11, wherein the source BMC communicates the security data to a target BMC of the target server over a BMC connection distinct from the inband connection.

14. The source server of claim 13, wherein the BMC connection is a sideband connection out of band with the inband connection.

15. A method comprising:
    identifying a target virtual machine (VM) hosted by a target central processing unit (CPU) of a target server, the target server including a target baseboard management controller (BMC);
    migrating a source VM hosted by a source CPU of a source server over a first connection between the source server and the target server to the target server, the source server including a source BMC; and
    in response to migrating the source VM, communicating security data corresponding to the source VM from the source BMC to the target BMC over a second connection connecting source BMC with target BMC and distinct from the first connection, wherein the security data includes a time-limited duration that is negotiated between the source BMC and the target VM.

16. The method of claim 15, wherein the security data includes a SBK corresponding to the source VM to be used to securely boot the target VM at the target server.

17. The method of claim 15, wherein the first connection is an inband connection and the second connection is a sideband connection out of band to the inband connection.

18. The method of claim 15, wherein the source CPU is connected to the source BMC by an internal server connection internal to the source server and the security data is communicated from a BIOS hosted by the source CPU to the source BMC over the internal server connection.

19. The method of claim 15, wherein the target BMC and the target CPU are communicatively connected internal to the server by an internal server connection.

20. The method of claim 19, wherein migrating the source VM triggers execution of virtual runtime services at the target CPU and the virtual runtime services access a system configuration table of the target server to dynamically map a path to the target BMC over the internal server connection to obtain the security data.

* * * * *